United States Patent
Berger et al.

(10) Patent No.: US 9,288,316 B2
(45) Date of Patent: Mar. 15, 2016

(54) SYSTEM AND METHOD FOR ELIMINATING HOLD-TIME IN PHONE CALLS

(75) Inventors: Shai Berger, Toronto (CA); Jason P. Bigue, Toronto (CA); Michael Pultz, Toronto (CA)

(73) Assignee: FonCloud, Inc., Toronto (CA)

( * ) Notice: Subject to any disclaimer, the term of this patent is extended or adjusted under 35 U.S.C. 154(b) by 997 days.

(21) Appl. No.: 12/396,603

(22) Filed: Mar. 3, 2009

(65) Prior Publication Data

US 2009/0207996 A1 Aug. 20, 2009

Related U.S. Application Data

(63) Continuation-in-part of application No. 12/276,621, filed on Nov. 24, 2008.

(60) Provisional application No. 61/033,856, filed on Mar. 5, 2008, provisional application No. 60/989,908, filed on Nov. 23, 2007.

(51) Int. Cl.
| | |
|---|---|
| *H04M 3/00* | (2006.01) |
| *H04M 5/00* | (2006.01) |
| *H04M 3/428* | (2006.01) |
| *H04M 3/523* | (2006.01) |

(52) U.S. Cl.
CPC ............ *H04M 3/428* (2013.01); *H04M 3/523* (2013.01); *H04M 2201/40* (2013.01); *H04M 2203/2077* (2013.01)

(58) Field of Classification Search
CPC ...... H04M 3/523; H04M 3/51; H04M 3/5183
USPC ............... 379/265.01, 265.02, 266.01
See application file for complete search history.

(56) References Cited

U.S. PATENT DOCUMENTS

| | | | |
|---|---|---|---|
| 4,169,217 A | 9/1979 | Szanto et al. |
| 4,228,324 A | 10/1980 | Rasmussen et al. |
| 4,425,479 A | 1/1984 | Dubner et al. |
| 4,731,822 A | 3/1988 | Berry, III et al. |
| 4,834,551 A | 5/1989 | Katz |
| 4,870,680 A | 9/1989 | Ohtsuka et al. |
| 5,627,884 A | 5/1997 | Williams et al. |
| 5,640,448 A | 6/1997 | Toyoshima |
| 5,737,393 A | 4/1998 | Wolf |
| 5,764,746 A | 6/1998 | Reichelt |
| 5,802,526 A | 9/1998 | Fawcett et al. |
| 5,822,405 A | 10/1998 | Astarabadi |
| 6,031,905 A | 2/2000 | Furman et al. |
| 6,049,600 A | 4/2000 | Nabkel et al. |
| 6,104,797 A | 8/2000 | Nabkel et al. |
| 6,118,861 A | 9/2000 | Gutzmann et al. |
| 6,122,346 A | 9/2000 | Grossman |

(Continued)

FOREIGN PATENT DOCUMENTS

| | | |
|---|---|---|
| EP | 1156649 A | 11/2001 |
| JP | 2001285493 | 10/2001 |

(Continued)

*Primary Examiner* — Oleg Asanbayev
(74) *Attorney, Agent, or Firm* — Carl M. Napolitano; GrayRobinson, P.A.

(57) ABSTRACT

An independent calling system (ICS) used in a transaction between a waiting party and a queuing party includes the queuing party having a queuing calling system (QCS) with the ICS adapted to communicate with the QCS and determine a hold status of the transaction.

22 Claims, 6 Drawing Sheets

(56) References Cited

U.S. PATENT DOCUMENTS

| | | | |
|---|---|---|---|
| 6,141,328 A * | 10/2000 | Nabkel et al. | 370/259 |
| 6,195,417 B1 | 2/2001 | Dans | |
| 6,201,855 B1 | 3/2001 | Kennedy | |
| 6,501,750 B1 | 12/2002 | Shaffer et al. | |
| 6,512,825 B1 | 1/2003 | Lindholm et al. | |
| 6,563,921 B1 | 5/2003 | Williams et al. | |
| 6,584,184 B1 | 6/2003 | Nabkel et al. | |
| 6,594,484 B1 | 7/2003 | Hitchings, Jr. | |
| 6,643,641 B1 | 11/2003 | Snyder | |
| 6,674,725 B2 | 1/2004 | Nabkel et al. | |
| 6,684,224 B2 | 1/2004 | Meding et al. | |
| 6,694,008 B1 | 2/2004 | Mukherji et al. | |
| 6,724,885 B1 | 4/2004 | Deutsch et al. | |
| 6,754,334 B2 | 6/2004 | Williams et al. | |
| 6,757,260 B2 | 6/2004 | Pandit | |
| 6,763,090 B2 | 7/2004 | Che et al. | |
| 6,788,770 B1 | 9/2004 | Cook et al. | |
| 6,804,342 B1 | 10/2004 | Gadant | |
| 6,807,274 B2 | 10/2004 | Joseph et al. | |
| 6,813,636 B1 | 11/2004 | Bean et al. | |
| 6,836,478 B1 | 12/2004 | Huang et al. | |
| 6,850,602 B1 | 2/2005 | Chou | |
| 6,914,962 B2 | 7/2005 | Neary | |
| 6,920,425 B1 | 7/2005 | Will et al. | |
| 6,990,524 B1 | 1/2006 | Hymel | |
| 6,999,944 B1 | 2/2006 | Cook | |
| 7,027,408 B2 | 4/2006 | Nabkel et al. | |
| 7,027,990 B2 | 4/2006 | Sussman | |
| 7,065,203 B1 | 6/2006 | Huart et al. | |
| 7,092,738 B2 | 8/2006 | Creamer et al. | |
| 7,113,987 B2 | 9/2006 | Nabkel et al. | |
| 7,120,244 B2 | 10/2006 | Joseph et al. | |
| 7,127,495 B2 | 10/2006 | Brown et al. | |
| 7,130,411 B2 | 10/2006 | Brown et al. | |
| 7,136,478 B1 | 11/2006 | Brand et al. | |
| 7,174,011 B2 | 2/2007 | Kortum et al. | |
| 7,215,759 B2 | 5/2007 | Brown et al. | |
| 7,221,753 B2 | 5/2007 | Hutton et al. | |
| 7,228,145 B2 | 6/2007 | Burritt et al. | |
| 7,231,035 B2 | 6/2007 | Walker et al. | |
| 7,251,252 B2 | 7/2007 | Norby | |
| 7,315,617 B2 | 1/2008 | Shaffer et al. | |
| 7,324,633 B2 | 1/2008 | Gao et al. | |
| 7,349,534 B2 | 3/2008 | Joseph et al. | |
| 7,414,981 B2 | 8/2008 | Jaramillo et al. | |
| 7,715,531 B1 | 5/2010 | Golding et al. | |
| 8,155,276 B2 | 4/2012 | Beauregard et al. | |
| 8,160,209 B2 | 4/2012 | Wang et al. | |
| 2003/0112931 A1 | 6/2003 | Brown et al. | |
| 2004/0202309 A1 * | 10/2004 | Baggenstoss et al. | 379/265.06 |
| 2005/0147219 A1 | 7/2005 | Comerford | |
| 2005/0147227 A1 | 7/2005 | Chervirala et al. | |
| 2006/0095564 A1 | 5/2006 | Gissel et al. | |
| 2006/0106613 A1 | 5/2006 | Mills | |
| 2006/0126803 A1 | 6/2006 | Patel et al. | |
| 2006/0245579 A1 | 11/2006 | Bienfait et al. | |
| 2006/0256949 A1 * | 11/2006 | Noble | 379/265.01 |
| 2007/0041564 A1 | 2/2007 | Antilli | |
| 2007/0071223 A1 | 3/2007 | Lee et al. | |
| 2007/0165608 A1 | 7/2007 | Altberg et al. | |
| 2007/0280460 A1 * | 12/2007 | Harris et al. | 379/201.01 |
| 2008/0039056 A1 | 2/2008 | Mathews et al. | |
| 2008/0144786 A1 | 6/2008 | Wang et al. | |
| 2008/0159495 A1 | 7/2008 | Dahan | |
| 2009/0149158 A1 | 6/2009 | Goldfarb et al. | |
| 2009/0154678 A1 | 6/2009 | Kewin et al. | |
| 2010/0057456 A1 | 3/2010 | Grigsby et al. | |
| 2011/0103559 A1 | 5/2011 | Andrews et al. | |

FOREIGN PATENT DOCUMENTS

| | | |
|---|---|---|
| JP | 2004304770 | 10/2004 |
| KR | 20040039586 A | 5/2004 |
| KR | 20040106487 | 12/2004 |
| KR | 1020050002930 | 1/2005 |

* cited by examiner

SYSTEM AND METHOD FOR ELIMINATING HOLD-TIME IN PHONE CALLS

CROSS-REFERENCE TO RELATED APPLICATIONS

This application claims the benefit of U.S. Provisional Patent Application Ser. No. 61/033,856 filed Mar. 5, 2008 and is a Continuation-In-Part of U.S. application Ser. No. 12/276,621 filed Nov. 24, 2008, which itself claims the benefit of U.S. Provisional Patent Application Ser. No. 60/989,908, filed Nov. 23, 2007, the disclosures of which are hereby incorporated by reference herein in their entireties and all commonly owned.

FIELD OF INVENTION

The present invention generally relates to communication call management, and more particularly to call hold queuing.

BACKGROUND OF THE INVENTION

When a client or user (waiting party) tries to reach a live agent at a large company or service center (queuing party), nowadays it is very likely that he or she will be put "on hold" before being connected to human (referred to as "live agent" in this disclosure). Being put in a hold queue has become a common frustration of everyday life. The phrase "waiting party" is used in this disclosure to collectively refer to the user, client, or the calling party or the on-hold party. The "queuing party" is used collectively to indicate the company or service center which could also be called the holding party which is different from the on-hold party.

A hold queue at a queuing party is managed by a Queuing Calling System (QCS), typically an IVR (Interactive Voice Response) system combined with an ACD (Automatic Call Distributor) system. The hold queue is an unfortunate artifact, stemming from the way the phone system was designed and is a sub-optimal solution for both parties. For the waiting party, hold-time means that it is tied to his or her phone (for an unknown period of time), unable to pursue other activities, make other calls, and potentially incurring per-minute costs. For the queuing party, hold-time results in customer frustration and costs money via the extra infrastructure required to keep phone lines open.

Over the years, a variety of prior art approaches have been proposed to eliminate hold-time.

By way of further example, these systems allow the waiting party to leave the phone and receive an audio or visual alert when a live agent is available. The main flaw in such a system is that the phone line is still held engaged, meaning that the phone cannot be used for another call, and that any applicable call charges are still incurred. Furthermore, as these systems may only be embodied as additional or peripheral hardware attached to a particular phone, they will not be available if the waiting party is at another phone. One example of this prior art approach is presented in U.S. Pat. No. 3,961,142.

Queuing Party Call-Back Systems

These systems are installed at the queuing party. When no live agents are available to handle a call, the waiting party hears a message explaining that all agents are busy and asking for his phone number. When a live agent is available, a component of the QCS dials the waiting party at the number he designated and connects him to the live agent. Examples of this prior art approach are presented in U.S. Pat. Nos. 5,627,884; 6,563,921 and 6,754,334.

One flaw in this system is that the waiting party has to trust that the queuing party will honor the promise to call back (and honor his position in the queue, versus other callers who remained on-hold). An additional flaw is that the waiting party may not be willing to give out his phone number. Adoption of this system has been further hindered by the fact that queuing parties are often unwilling to incur the charges of calling back. A variant of this system allows the waiting party to make a request for a call-back through an online interface (e.g. a web page), but the same flaws are still present. Examples of this prior art approach are presented in U.S. Pat. Nos. 5,436,967; 5,185,782 and 5,155,761.

Third Party Call-Back Systems

This is a variant of approach number 2 discussed above, where the call-back approach is handled by a third party. In such a system, the waiting party is represented to the QCS by an intermediary system sometimes called the Originating Communication System (OCS). The two communication systems negotiate how to handle the hold situation. The OCS may be deployed and operated by the carrier, the queuing party itself or a neutral third party. In all cases, the primary flaw is that the QCS has to be aware and configured to negotiate with the OCS. Thus, there is a definite added cost to the queuing party. Since there is a large variety of hardware and software used for the QCS, the integration with the OCS is not trivial. Thus, adoption of this system will continue to be very slow. One example of this prior art approach is presented in U.S. Pat. No. 6,141,328.

A better solution would be for some sort of signaling system to exist whereby a waiting party could request attention from a live agent, and then receive a signal from the QCS when the live agent is present. Unfortunately, no standard exists for such a signaling system. Hence, hold-time is not likely to disappear anytime soon.

It is therefore desirable to provide a communication system and method which allows the user (the waiting party) to reach a live agent at a particular company or service center (the queuing party) without waiting in a hold queue.

SUMMARY OF THE INVENTION

Embodiments of the present invention provide in one aspect, an independent calling system (ICS) used in a transaction between a waiting party and a queuing party, the queuing party having a queuing calling system (QCS), the ICS adapted to communicate with the QCS and determine a hold status of the transaction.

In another aspect, the present embodiments provide a method used in a transaction between a waiting party and a queuing party, the queuing party having a queuing calling system (QCS), the method comprising communicating with the QCS and determining a hold status of the transaction independently.

BRIEF DESCRIPTION OF THE DRAWINGS

Embodiments of the invention are herein described by way of example with reference to the accompanying drawings in which.

DETAILED DESCRIPTION OF THE PREFERRED EMBODIMENTS

Figure 1:
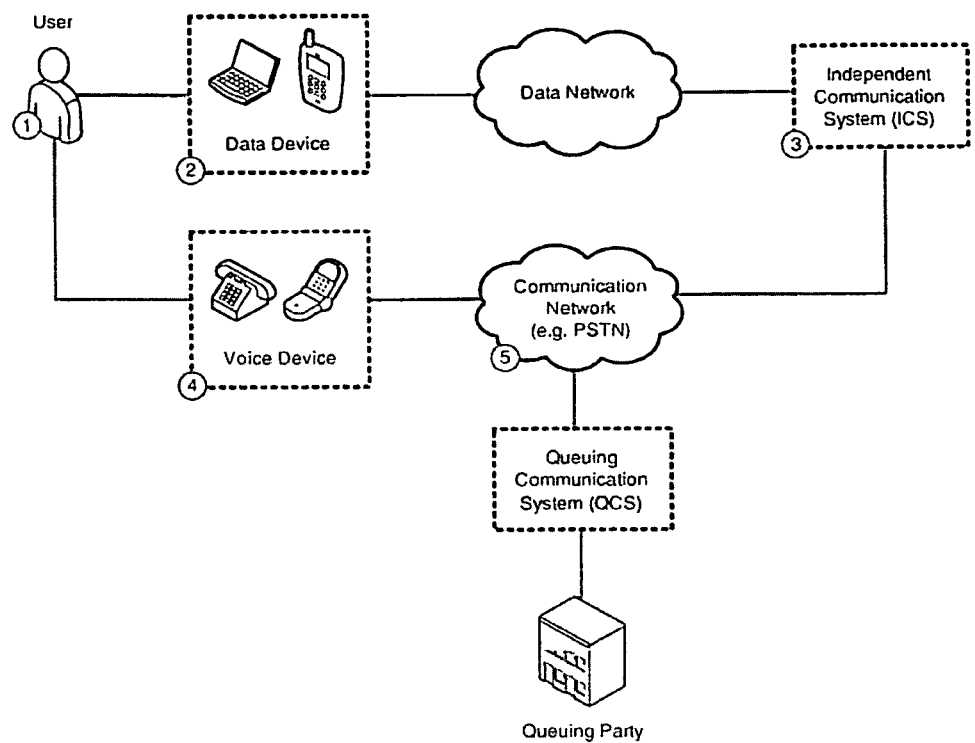
FIG. 1 is an illustration of a communications system that incorporates an exemplary embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

By way of example, embodiments of the present invention presented herein differ from existing prior art solutions to this problem in that they do not necessarily require cooperation from the queuing party.

The embodiments presented herein provide a communications system referred to as the Independent Communication System (ICS) that is partially or completely independent of the queuing party and of any telephone network carriers. The ICS is interoperable with a voice and/or data communication network (e.g. PSTN, internet) such that it can connect with the QCS. The ICS of the present embodiments has the ability to perform at least some of the following:

1) Send commands to the QCS (such as DTMF tones, voice cues, or software commands over a network);
2) Differentiate between the on-hold state and the live state (i.e. the state when a live agent is ready to talk);
3) Play recorded messages (and computer generated speech) to the live agents at the queuing party via the QCS;
4) Dial the waiting party number and connect it to the QCS.

Further, and as described in above referenced U.S. application Ser. No. 12/276,621, the disclosure of which is incorporated by reference, in some embodiments the cue profile may contain hold status "audio cues" which are used to detect the hold status for a particular queuing party. Audio cues are any audible cues that could bear information about the hold status. For instance, music, pre-recorded voice, silence, or any combination thereof could indicate an on-hold state. On the other hand, the voice of an actual person could indicate a live state. The event of transition from an on-hold state to a live state could be very subtle. For instance, the transition from a recorded message to a live agent speaking may not be accompanied by any distinguished audio message like a standard greeting. Nevertheless there are audio cues indicating the transition from an on-hold state to a live state. Such audio cues are called "transition audio cues".

In some embodiments, the actions of the ICS are directed by the waiting party through a visual interface (e.g. on a PC, display, or mobile device) or through an interactive voice response (IVR) system (e.g. on a telephone or similar device).

The ICS has the capability to dial the phone system of a party designated by the waiting party (usually the queuing party) and connect with their Queuing Communication System (QCS). The ICS may then send commands (such as DTMF tones, voice cues, software commands) to the QCS in order to enter the hold queue. The ICS may then wait on hold, on behalf of the waiting party, with the QCS. To the QCS, there is no indication that the party on hold is the ICS and not the waiting party. When a live agent is ready, the ICS calls the waiting party and connects it to the QCS (and, hence, to the live agent).

In some embodiments presented herein, there is provided a communications method which includes receiving a request from a waiting party to talk to an agent at a given queuing party. The queuing party is then called and sent appropriate commands (such as DTMF tones, voice cues, and software commands) to enter the hold queue. When a live agent is detected, the waiting party is called, at a phone number (or other real-time communication address) previously indicated by the waiting party, and connected to the queuing party.

The embodiments presented herein bring advantages to both the waiting party and the queuing party. The waiting party benefits by being freed from waiting on hold for a live agent. The waiting party may also save money from the reduced phone time (especially if the waiting party is using a mobile phone). If the waiting party is a business, the on-hold time could also be costly. The queuing party benefits by having less frustrated waiting parties. Furthermore, these embodiments present no explicit cost or effort to the queuing party.

FIG. 1 shows an illustrative communications system that incorporates an exemplary embodiment given herein. The waiting party 1 interacts with a data device 2 for controlling the ICS and receiving information from it. The data device is typically embodied as a web site on a PC or mobile device, which interacts with the ICS 3 through a data network such as the Internet. The waiting party also interacts with a voice device 4 for real-time audio communication with the queuing party over a real-time Communication Network 5. The voice device is typically a fixed-line or wireless telephone and the real-time Audio Communication Network is typically the Public Switched Telephone Network (PSTN).

Figure 2:
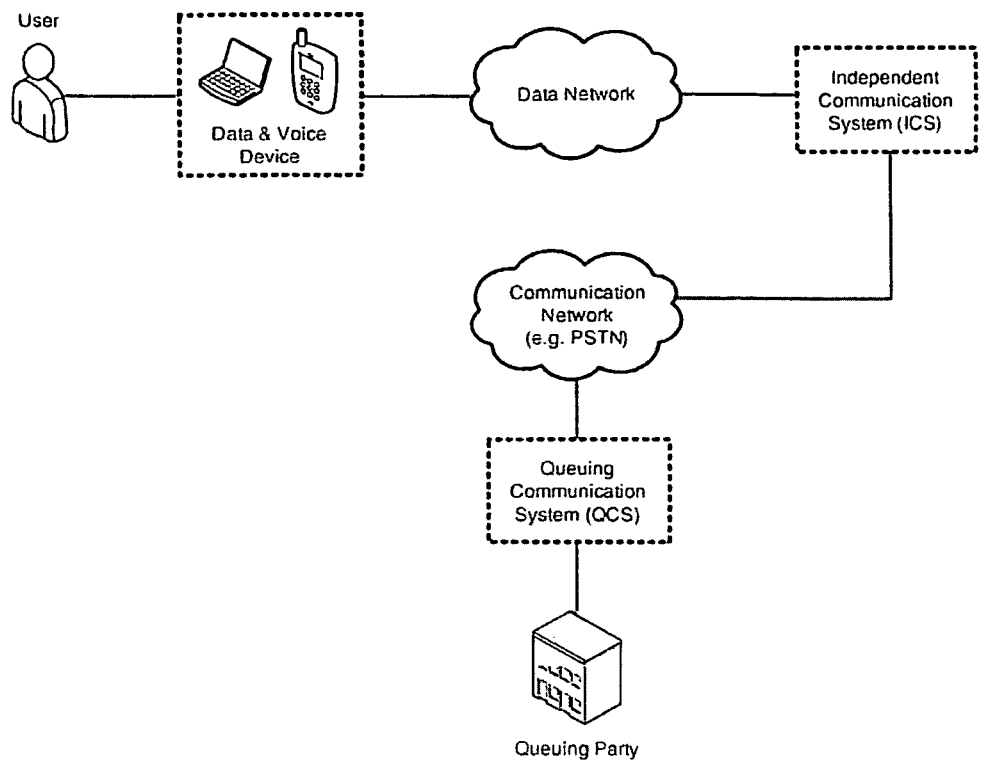
FIG. 2 is an illustration of a communications system that incorporates an exemplary embodiment where the voice device is an IP based phone.

FIG. 2 shows another illustrative communications system that incorporates an exemplary embodiment. In this embodiment, the voice device is an "IP-based" phone or IP communication system, which could communicate over a packet-based network, such as the Internet. The voice device in this case, may also be a softphone (internet-based phone) that operates as software on a computer. It is further possible that the voice device is a softphone operating on the waiting party's data device, so that one device fills the roles of both voice device and data device. Alternatively, a combination of the above cases is also possible.

Figure 3:
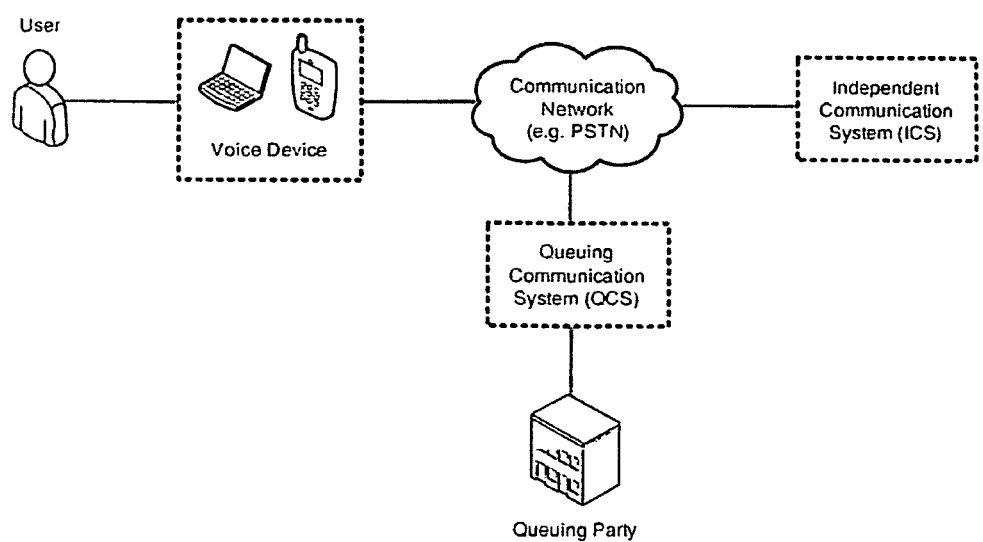
FIG. 3 is an illustration of a communications system that incorporates an exemplary embodiment where the waiting party uses only a voice device and controls an ICS using an IVR-type system.

FIG. 3 shows another illustrative communications system that incorporates an exemplary embodiment. In this embodiment, the role of the data device is replaced by an IVR system. Accordingly, the waiting party controls the ICS and receives data from it through a voice device, using commands such as DTMF tones or voice cues. In this embodiment, one device fills the roles of both voice device and data device.

In some embodiments, the waiting party must specify a voice address (e.g. a phone number, an SIP address, web-based phone address, etc.) that allows real-time two-way audio communication between him or her and the ICS. In some embodiments, the voice address is selected automatically based on information about the waiting party (such as the last voice address he or she used) stored in a database accessible by the ICS and/or information that identify the data device (such an IP address or a browser cookie).

Figure 4:
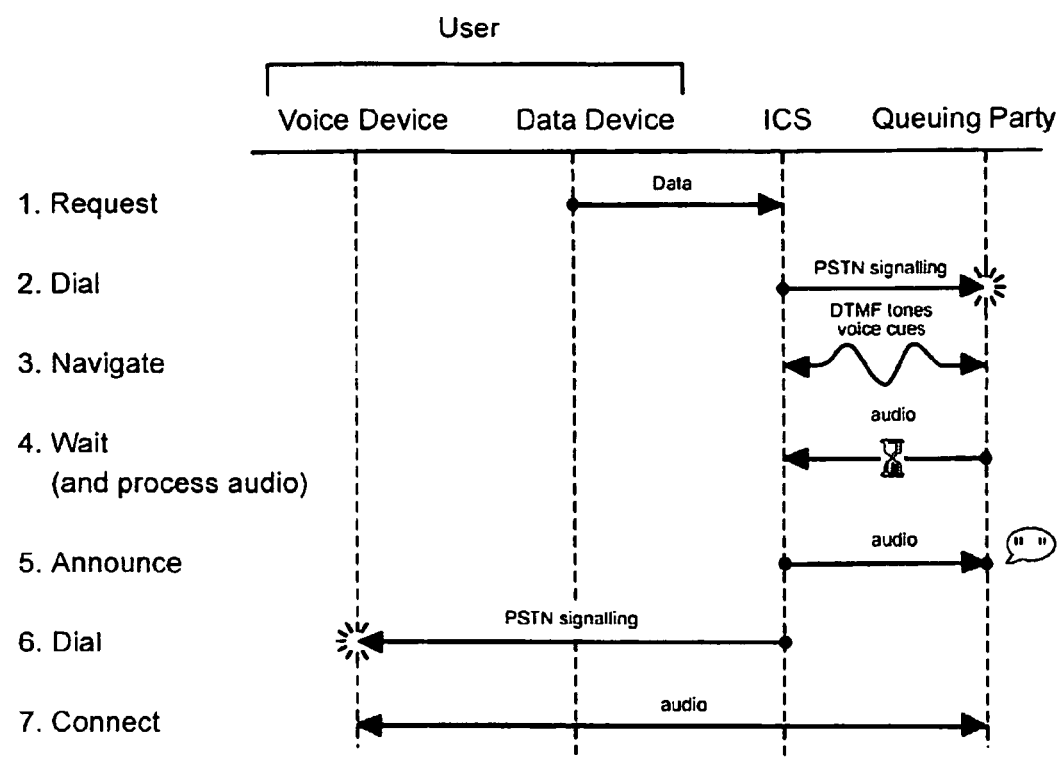
FIG. 4 is an illustration of a timeline describing a typical transaction using a system according to some embodiments.

FIG. 4 shows an illustrative timeline describing a typical transaction using a system according to some embodiments, which is further elaborated below, wherein numbers to the left may correspond to the steps in a process.

1. Request. The transaction begins when a waiting party makes a request to the ICS, through the data device, to place a call to a given company queuing party.

2. Dial. The ICS dials the queuing party, typically over the PSTN, and connects to the Queuing Communication System (QCS), e.g. an Interactive Voice Response (IVR) system.

3. Navigate. The ICS sends to the QCS the commands required to request a live agent. These commands could be DTMF tones, voice cues, or software commands. If a live agent is immediately available, the ICS skips to step 6.

4. Wait. The ICS enters the hold queue and waits for a live agent to connect to the line. The ICS could detect this transition by continually or intermittently processing the audio and searching for certain cues.

5. Announce. In some embodiments, when a live agent is ready, the ICS announces to the live agent, using pre-recorded audio or computer generated speech, that the call is being connected to the waiting party. A typical announcement might say: "Please wait while the customer is being connected."

6. Dial. The ICS dials the waiting party using the information she or he provided in step 1. In some embodiments, this step is not necessary.

7. Connect. When the waiting party answers, it is connected to the QCS, and can begin a normal conversation with the live agent.

Figure 5:
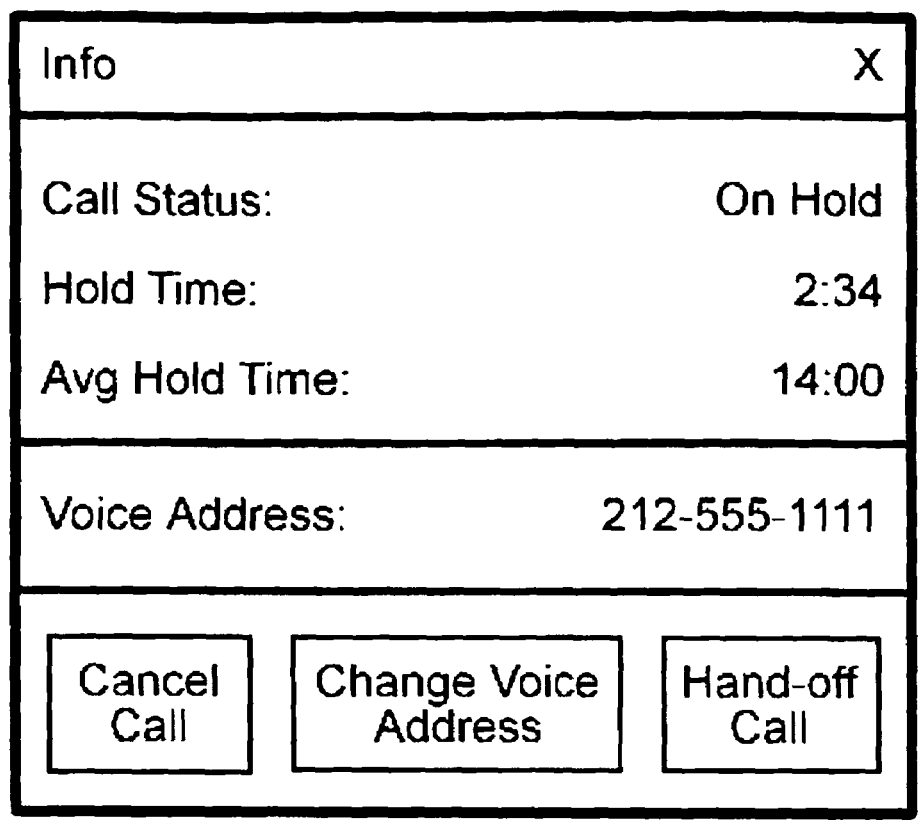
FIG. 5 is an illustration of an exemplary embodiment incorporating a visual interface that shows the calling party the status of the call and gives the calling party the ability to cancel the call.

In some embodiments, the ICS can report the status of the call to the waiting party in a variety of ways. In certain embodiments where the data device has a visual interface (e.g. on a PC, multimedia device, or mobile device), the status may be displayed as shown in FIG. 5. The data reported may include the call status (which may indicate, for example, which stage of the timeline from FIG. 4 is current), the hold-time which is the time spent on hold so far, the average hold time for the current queuing party, and other information. In some embodiments, this information could be reported as audio or plain text.

Figure 6:
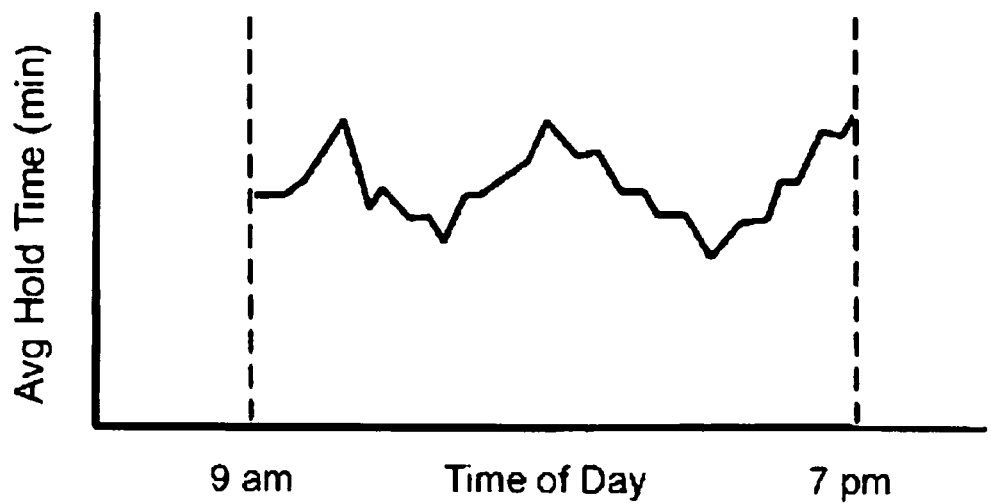
FIG. 6 is an illustration of an exemplary embodiment incorporating a visual interface that allows the calling party to schedule a call with a given queuing party for a later date.

As the ICS is used by many waiting parties over a period of many days, it is possible for aggregate statistics to be collected about particular queuing parties, such as average hold time, call volume and call duration. Furthermore, it is possible to see how these values relate to the time of day, day of the week or time of the year. Furthermore, this information could be presented to waiting parties of the ICS, and could potentially be used as advice for when it is optimal to schedule a call. FIG. 6 illustrates an example of how this information might be represented in one embodiment given herein. In this Figure, the average hold time is depicted as a function of the time of the day.

Figure 7:
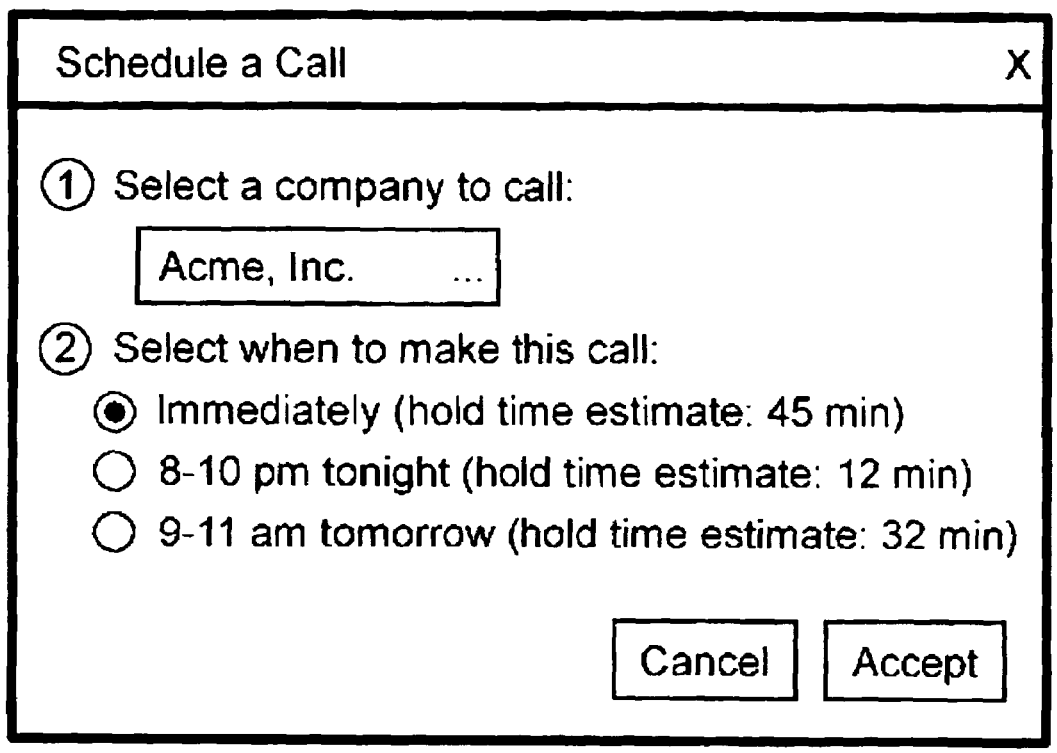
FIG. 7 is an illustration of exemplary ICS incorporating advanced scheduled calling.

In some embodiments, the ICS can allow the waiting party to schedule a call to a queuing party in advance. In certain embodiments where the data device has a visual interface (e.g. on a PC, multimedia device, or mobile device), the waiting party could be presented with an interface similar to the one shown in FIG. 7, where several time slots are proposed, along with estimated waiting times. In some embodiments, this interaction may be voice-based or text-based.

In some embodiments, the ICS can allow the waiting party to change the voice address after the call request has been initiated. In certain embodiments this change may be possible at any point up to step 6 in FIG. 4. In embodiments where the data device has a visual interface (e.g. on a PC, multimedia device, or mobile device), this process could be initiated by clicking a button or icon or link (e.g. "Change Voice Address") as shown in FIG. 5. In some embodiments, this interaction may be voice-based or text-based.

In some embodiments, the ICS can allow the waiting party to cancel the call after the call request has been initiated. In certain embodiments this change may be possible at any point up to step 6 in FIG. 4. In embodiments where the data device has a visual interface (e.g. on a PC, multimedia device, or mobile device), this process could be initiated by clicking a button or icon or link (e.g. "Cancel Call") as shown in FIG. 5. In some embodiments, this interaction may be voice-based or text-based.

In some embodiments, the ICS can allow the waiting party to transfer (or "hand-off") the call to another waiting party of the ICS, after the call request has been initiated. In certain embodiments this change may be possible at any point up to step 6 in FIG. 4. In embodiments where the data device has a visual interface (e.g. on a PC, multimedia device, or mobile device), this process could be initiated by clicking a button or icon or link (e.g. "Hand-off Call") as shown in FIG. 5. At that point, the waiting party may be prompted to designate which waiting party of the system is to receive the call. In some embodiments, this interaction may be voice-based or text-based.

One benefit of the embodiments presented herein is to provide a communication system and method which allows a waiting party to reach an agent at a queuing party without being on hold.

Another benefit of the embodiments presented herein is to provide such a system and method in a way that requires no changes to the communication system of the queuing party, namely, the Queuing Communication System (QCS).

Another benefit of the embodiments presented herein is to provide such a system and method in a way that is transparent to the queuing party, requires no negotiation with the queuing party and requires no cooperation from the queuing party.

Another benefit of the embodiments presented herein is to provide such a system and method in a way that provides real-time, or near real-time, feedback to the waiting party about the status of the call.

Another benefit of the embodiments presented herein is to provide such a system and method in a way that allows the collection of aggregate statistics such as average hold time, and to report those statistics to the waiting party and the queuing party, or a third party.

Another benefit of the embodiments presented herein is to provide such a system and method in a way that allows the waiting party to schedule a time for a call to be placed in advance (so that it matches his schedule of availability).

Another benefit of the embodiments presented herein is to provide such a system and method in a way that allows the waiting party to specify a voice address (e.g. a phone number, a SIP address, web-based phone address, etc.) that allows real-time two-way audio communication where she or he can be reached, and allows her or him to change the voice address while she or he is on hold.

Another benefit of the embodiments presented herein is to provide such a system and method in a way that automatically selects an appropriate voice address based on profile information stored about the waiting party or other information.

Another benefit of the embodiments presented herein is to provide such a system and method in a way that allows the waiting party to cancel his request to reach a live agent.

Another benefit of the embodiments presented herein is to provide such a system and method in a way that allows the waiting party to transfer its place in the hold queue to another waiting party.

Many modifications and other embodiments of the invention will come to the mind of one skilled in the art having the benefit of the teachings presented in the foregoing descriptions and associated drawings. Therefore, it is understood that the invention is not to be limited to the specific embodiments disclosed, and that modifications and embodiments are intended to be included within the scope of the appended claims.

That which is claimed is:

1. An independent calling system (ICS) implemented in a transaction between a waiting party and a queuing party, the queuing party having a queuing calling system (QCS) and a phone system associated with the QCS, the ICS comprising a dial device dialing the phone system associated with the QCS and a navigate device using recorded and computer generated DTMF tones and voice cues to navigate without interaction from the waiting party an interactive voice response (IVR) menu of the phone system associated with the QCS and an audio processor processing at least one of continually and intermittently electronically processing audio received from the phone system associated with the QCS and searching for certain cues from the QCS to identify a transition from an on-hold state to a live state in which an agent is present, such that the ICS does not require cooperation from the QCS except for directing dialing and navigating the phone system associated with the QCS on behalf of the waiting party.

2. The ICS of claim 1, wherein the ICS is adapted to allow the waiting party to specify a voice address and to call the waiting party at the voice address once a live agent at the queuing party is available.

3. The ICS of claim 1, wherein the ICS is adapted to inform the waiting party of the hold status.

4. The ICS of claim 1, wherein the ICS is adapted to accept and handle at least one of a cancellation, a handoff, an advance scheduled calling, and a change of voice address upon request from the waiting party.

5. The ICS of claim 1, wherein the ICS is adapted to generate aggregate statistics about a queuing party, the aggregate statistics comprising at least one of an average hold time, a call volume, a call duration, and an optimal time to schedule a call.

6. The ICS of claim 5, wherein the ICS is further adapted to display or inform the aggregate statistics.

7. The ICS of claim 1, wherein the ICS is adapted to automatically select an appropriate voice address of the waiting party.

8. The ICS of claim 7, wherein the ICS is adapted to select the voice address based on profile information about the waiting party.

9. The system of claim 1, wherein the certain cues comprise at least one of music, pre-recorded voice, silence, or any combination thereof.

10. A method implemented in a transaction between a waiting party and a queuing party, the queuing party having a queuing calling system (QCS) and a phone system associated with the QCS, the method comprising electronically dialing the phone system associated with the QCS using computer generated and recorded DTMF tones and voice cues to navigate without interaction from the waiting party an interactive voice response (IVR) menu of the phone system, and at least one of continually and intermittently electronically processing audio received from the phone system associated with the QCS and searching for certain cues from the QCS to identify a transition from an on-hold state to a live state in which an agent is present, wherein the method does not require cooperation from the QCS except for directing dialing and navigating the phone system associated with the QCS on behalf of the waiting party.

11. The method of claim 10, wherein the method allows the waiting party to specify a voice address and to call the waiting party at the voice address once a live agent at the queuing party is available.

12. The method of claim 10, further informing the waiting party of the hold status.

13. The method of claim 10, further accepting and handling at least one of a cancellation, a handoff, an advance scheduled calling, and a change of voice address upon request from the waiting party.

14. The method of claim 10, further generating aggregate statistics about a queuing party, the aggregate statistics comprising at least one of an average hold time, a call volume, a call duration, and an optimal time to schedule a call.

15. The method of claim 14, further displaying or informing the aggregate statistics.

16. The method of claim 10, further automatically selecting an appropriate voice address of the waiting party.

17. The method of claim 16, further selecting the voice address based on profile information about the waiting party.

18. The ICS of claim 1, wherein the voice cues are generated by at least one of using pre-recorded audio and computer generated speech.

19. The ICS of claim 1, wherein the ICS is further adapted to communicate the hold status via at least one of graphics, voice, and text to at least one of a mobile device and a computer.

20. The method of claim 10, further comprising generating the voice cues by at least one of using pre-recorded audio and using computer generated speech.

21. The method of claim 10, further comprising communicating the hold status via at least one of graphics, voice, and text to at least one of a mobile device and a computer.

22. The method of claim 10, wherein the certain cues comprise at least one of music, pre-recorded voice, silence, or any combination thereof.

* * * * *